Figure 1:
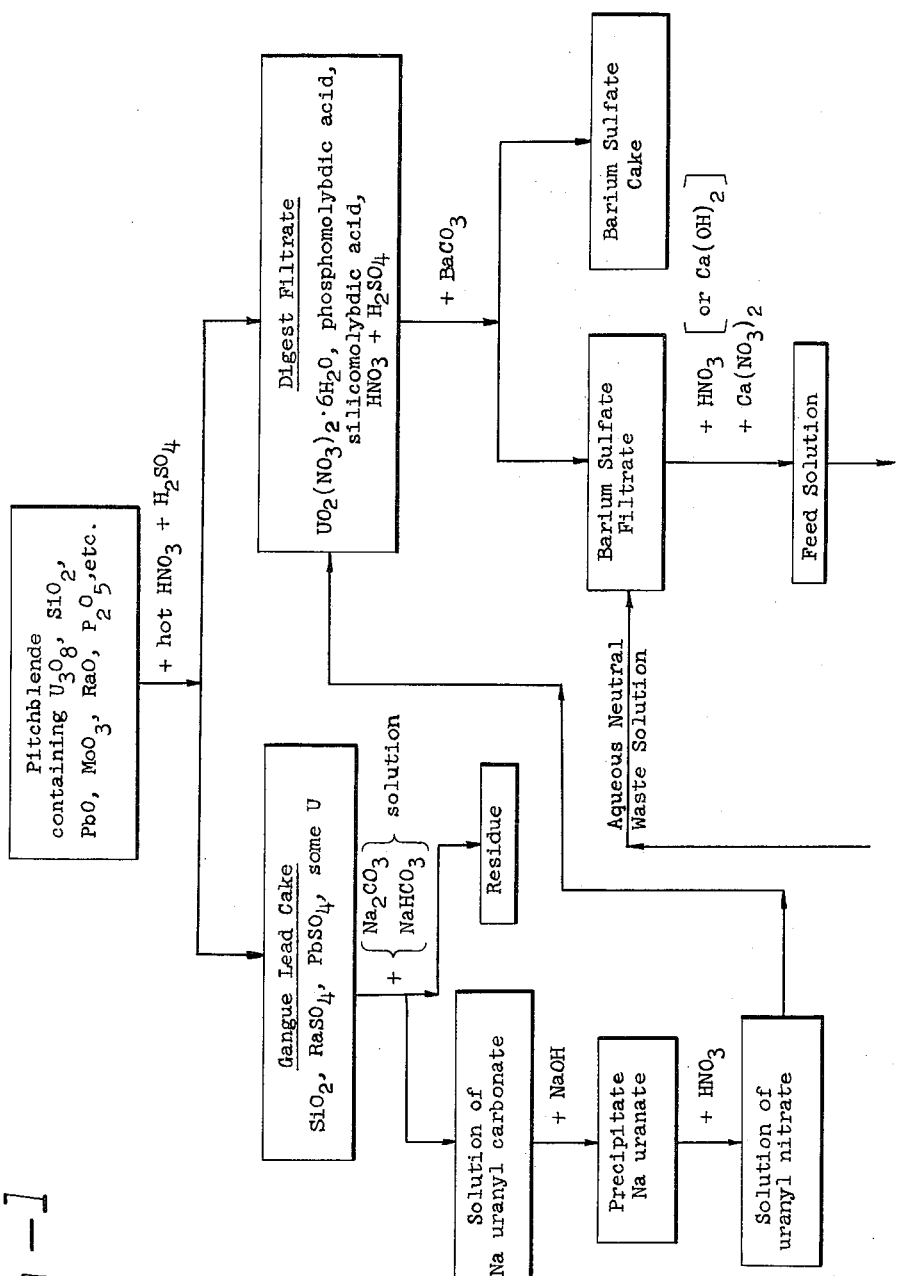

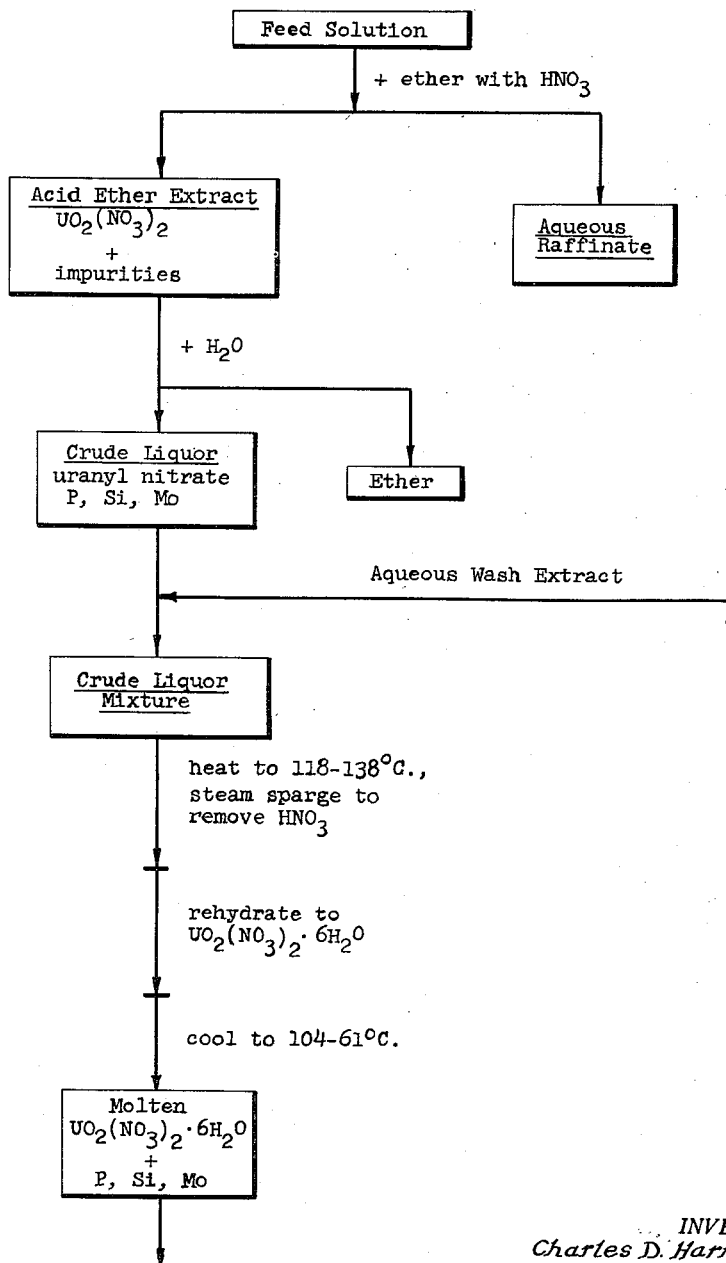

July 1, 1958
C. D. HARRINGTON ET AL
2,841,466
URANIUM EXTRACTION
Filed Dec. 29, 1953
3 Sheets-Sheet 3
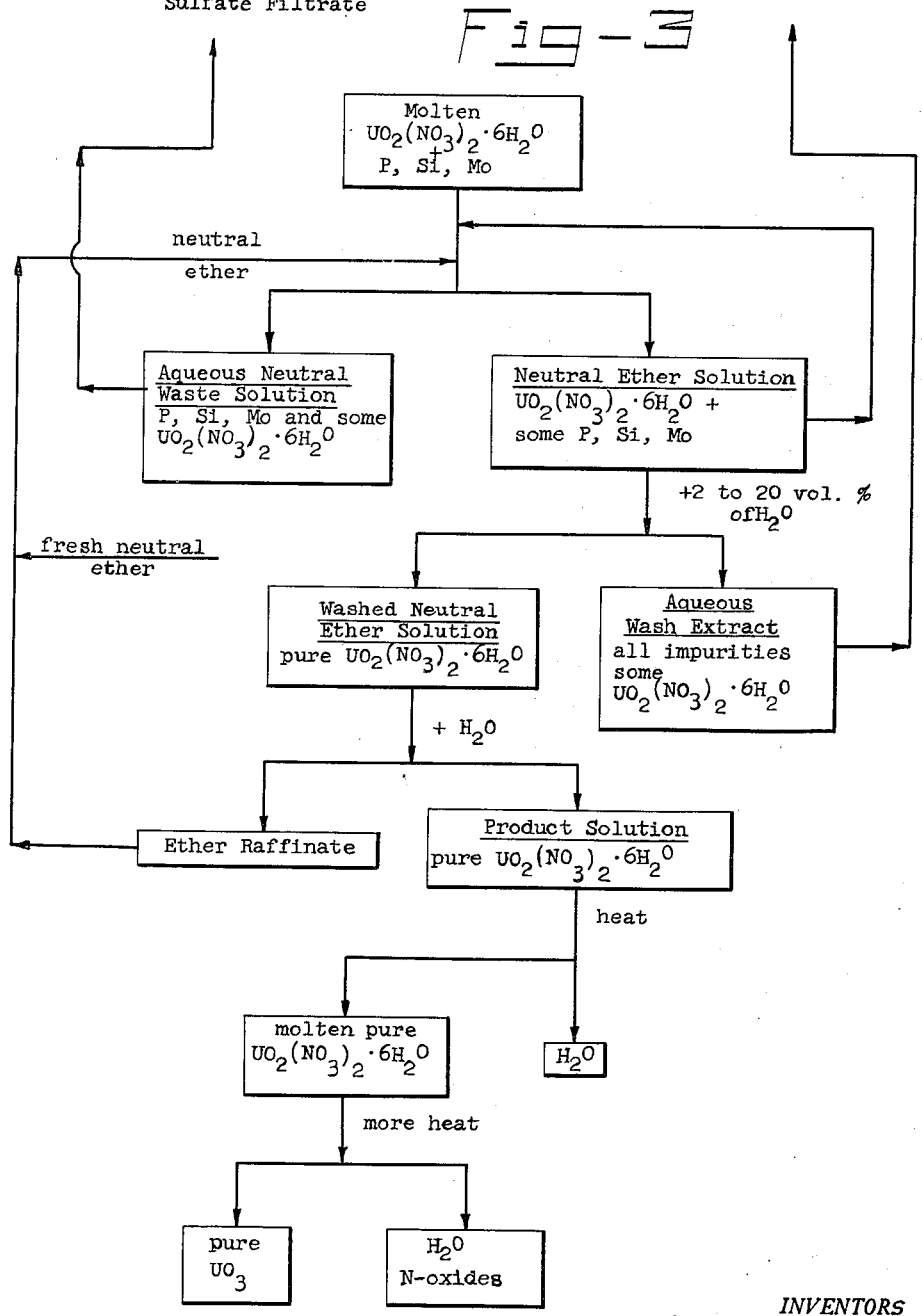
INVENTORS
Charles D. Harrington
John V. Opie
BY
Roland G. Anderson
Attorney

United States Patent Office 2,841,466
Patented July 1, 1958

2,841,466

URANIUM EXTRACTION

Charles D. Harrington and John V. Opie, St. Louis, Mo., assignors to the United States of America as represented by the United States Atomic Energy Commission Application December 29, 1953, Serial No. 401,101

24 Claims. (Cl. 23—14.5)

This invention deals with the recovery of uranium values from various uranium-containing raw materials, such as ores, intermediate solutions obtained during processing of ores and of other uranium-containing materials, and also from uranium-containing waste products.

It is an object of this invention to provide a process for the recovery of uranium from uranium-containing materials which yields a practically quantitative output.

It is another object of this invention to provide a process for the recovery of uranium from uranium-containing materials by which the uranium is quantitatively recovered and obtained in a high degree of purity, especially with respect to molybdenum impurity.

It is finally also an object of this invention to provide a process for the recovery of uranium from uranium-containing materials which consumes very small amounts of reaction substances so that the cost of the process is very low.

These and other objects are accomplished by providing a nitric acid solution of the material which contains uranium and other ingredients as impurities; adding a water-soluble nitrate as a salting-out agent, thereby forming a feed solution; contacting said feed solution with diethyl ether whereby the bulk of uranyl nitrate and a minor quantity of impurities are taken up by the ether in the form of an acid ether extract while the bulk of the impurities remain in an aqueous raffinate; separating said acid ether extract from said aqueous raffinate; contacting said acid ether extract with water whereby said uranyl nitrate and impurities are re-extracted into said water to form a crude liquor; heating said crude liquor to at least 118° C. to remove water solvent and nitric acid and to obtain molten uranyl nitrate hexahydrate; cooling said molten uranyl nitrate hexahydrate to a temperature between 104 and 61° C.; contacting said uranyl nitrate hexahydrate with acid-free diethyl ether whereby the bulk of the uranyl nitrate hexahydrate is extracted into said acid-free ether to form a neutral ether solution, while the bulk of said impurities are contained in an aqueous neutral waste solution; separating said neutral ether solution from said aqueous neutral waste solution; contacting said neutral ether solution with from 2 to 20% of its volume of water whereby said impurities that have remained in said neutral ether solution are selectively back-extracted into said water to form a wash extract; separating said wash extract from the uranyl nitrate-containing washed neutral ether solution formed; contacting said washed neutral ether solution with at least one-half volume of water per volume of ether solution whereby uranyl nitrate is extracted into said water to form an aqueous product solution and an ether raffinate; and separating the product solution from said ether raffinate.

The invention will now be described in detail as applied to the processing of pitchblende, a material for which the novel method is particularly well suitable. However, the process is equally well adjustable to the recovery of uranium values from other materials, such as sodium uranate obtained from the residues of the vanadium industry, magnesium uranate precipitate containing about 20 to 40% uranium on a dry basis derived from sulfuric acid leach liquors of tailings from pitchblende recovery and concentration operations, and similarly composed materials and mixtures thereof. A typical magnesium uranate precipitate has the following composition: 25.58% $H_2O$, 33.58% $U_3O_8$, 0.029% PbO, 7.5% $SiO_2$, 7.06% $SO_4^=$, 0.45% V, 114 p. p. m. B, 2.9% Fe, 0.21% $MoO_3$, and 1.13% CaO.

Analyses of pitchblende ores show the following ranges in components and concentrations:

| | Percent |
|---|---|
| $U_3O_8$ | 50–65. |
| $SiO_2$ | 16–21. |
| PbO | 5–6.5. |
| $Fe_2O_3$ | 0.25–0.50. |
| $MoO_3$ | 0.5–0.8. |
| NiO | 0.5–2.2. |
| $Al_2O_3$ | About 0.6. |
| CaO | 0.4–1.0. |
| MgO | About 2.2. |
| CuO | 0.10–0.35. |
| Co | About 0.17. |
| $MnO_2$ | 0.02–0.05. |
| $V_2O_3$ | About 0.06. |
| $TiO_2$ | About 0.06. |
| BaO | About 0.06. |
| RaO | Small quantities. |
| Rare earths | About 0.16. |
| $CO_2$ | About 1.5. |
| $SO_3$ | About 0.45. |
| $P_2O_5$ | About 1.11. |

In the following a preferred embodiment of the process of this invention as applied to the processing of pitchblende will be described in detail. The flow sheet on the attached drawings also illustrates the various steps of this embodiment, Fig. 1 showing the preparation of the feed solution for the acid extraction illustrated in Fig. 2, together with the feed preparation for the neutral extraction shown in Fig. 3.

Pitchblende was mixed with concentrated nitric acid for the dissolution of the acid-soluble components of the ore. A temperature raise to about 95° C. and a digestion time of 3 to 4 hours were found to improve the degree of solution obtained.

Pitchblende, as has been shown above, contains from 5 to 6.5% lead oxide. It is advisable to eliminate the lead right in the beginning, simultaneously with the dissolving step, because a lead content in the solution would complicate the later extraction with ether. For this reason, sulfuric acid is added to the concentrated nitric acid used for dissolving the ore; lead is thereby precipitated in the form of lead sulfate. The quantity of sulfuric acid should be in excess of that stoichiometrically required for quantitative lead precipitation; for instance, from 2 to 7 times the stoichiometric quantity was found suitable, 6.5 times the stoichiometric amount being the preferred weight. The uranium recovery is also increased thereby and this with increasing quantity of sulfuric acid, because the sulfuric acid decomposes any complex uranium compounds, such as uranium-molybdenum compounds, whereby the uranium tied up in such compounds is made available for recovery by solvent extraction. Some types of pitchblende have a sufficiently high sulfuric acid content originally so that the addition of sulfuric acid is then unnecessary.

The reaction mixture, after acid digestion, is then filtered. It is thereby separated into a "gangue lead cake" which contains the silica, the lead sulfate, some radium sulfate carried on the lead sulfate, and minor quantities of uranium salt, and into the so-called digest filtrate which contains the bulk of the uranium values, phosphomolybdic acid, silicomolybdic acid, nitric acid, and the excess sulfuric acid.

The gangue lead cake, for the removal and recovery of the minor quantities of uranium salt, is suitably subjected to an "after treatment" before discarding. One way of achieving this feature comprises washing the gangue lead cake on the filter with water (about 30% of the weight of the ore), reslurrying the precipitate with water (about a weight equal to that of the ore), filtering again, and again washing the filter cake with about 30% of the ore weight of water. The wash waters and filtrates are combined with the digest liquor for further processing.

Another way of "after treating" the gangue lead cake (that shown in the flow sheet) comprises adding an aqueous sodium carbonate- and sodium bicarbonate-containing solution whereby the uranium is dissolved in the form of sodium uranyl tricarbonate. After separation of this solution from the remaining residue, an aqueous sodium hydroxide solution is added to the solution; uranium is precipitated thereby as sodium uranate. The precipitate, after being isolated from the solution, is then dissolved in nitric acid and the uranyl nitrate solution thus resulting is added to the digest filtrate.

The excess sulfuric acid must then be removed from the digest filtrate because the sulfate anions complex uranium and thus impair the extraction of the uranyl nitrate into ether. A barium salt is added for this purpose, for instance, barium nitrate or barium carbonate, the latter being the preferred salt. The addition of the barium salt has another advantage; it removes any residual radium salt not precipitated in the gangue lead cake. The barium sulfate formed will carry any radium sulfate present in the digest liquor.

An excess of barium salt over that stoichiometrically required should be added. It was found that good results are obtained if the amount added equals the stoichiometric quantity necessary for precipitation of all the sulfuric acid plus an excess of 1 lb. per 60 lbs. of ore. However, the quantity of barium salt may vary widely without making the process inoperative. If barium carbonate is used, it is preferably added in the form of an aqueous slurry formed by mixing 1 part by weight of barium carbonate and 2 parts by weight of water. The use of elevated temperature is preferred for the barium sulfate precipitation. The precipitate, or "barium sulfate cake," is then separated from the digest filtrate to obtain the "barium sulfate filtrate" by any means known to those skilled in the art.

The aqueous solution, or "barium sulfate filtrate," is then "made up" to have the proper ingredients and concentrations for a "feed solution" for the acid ether extraction phase of the process. However, prior to the make-up step "aqueous neutral waste solution," which is obtained when molten uranyl nitrate hexahydrate is contacted with neutral ether, as will be described later, and which always still contains small quantities of uranyl nitrate, is usually added to this aqueous solution.

While satisfactory extraction results are obtained with feed solutions of various uranyl nitrate concentrations, it was advantageous to have concentrations between 2 and 2.75 lbs. of uranyl nitrate hexahydrate per gallon of solution. A concentration of 2.5 lbs./gal. was found to be optimal for the preferred concentration of salting-out agent to be discussed below.

As far as the uranium extraction is concerned, the degree of acidity of the feed solution is important. An excess of nitric acid in the feed solution is necessary in order to avoid precipitation of complex phosphorus and molybdenum uranyl compounds and thus to eliminate one reason for the occurrence of uranium losses. An excess of nitric acid is considered that amount above the amount of nitric acid necessary stoichiometrically to combine with the respective cations present in the solution. The amount of nitric acid required to prevent this precipitation, of course, depends on the amount of molybdate and phosphate radicals present. For a solution containing the above-given uranyl nitrate concentration of between 2 and 2.75 lbs./gal. and having the maximum molybdenum and phosphorus contents possibly to be expected in pitchblende solutions obtained as described heretofore, an excess acidity of 0.5 N nitric acid was found sufficient to prevent the precipitation. An acidity ranging from 0.5 to 2 N was found suitable. Uranium extraction generally amounted to above 99.5% with nitric acid concentrations in the feed solution ranging from 0.05 to 1.75 N.

Although an acidic feed solution permits the maximum uranium extraction, an undesirable result is coextraction of molybdenum as ether-extractable heteropoly acid complexes with phosphorus and silicon, viz., phosphomolybdic and silicomolybdic acid formed in the acid medium.

In order to adjust the acidity to the desired concentration, some nitric acid has to be added or neutralized, depending upon whether the prevailing acidity is below or above the value desired. If neutralization is necessary, the base is advantageously chosen so that it forms, together with the nitric acid, the salting-out agent desired. (A salting-out agent is an inorganic compound which is highly soluble in water and which, when added in sufficient amounts to an aqueous salt solution to be extracted, promotes the interchange of said salt into an organic solvent therefor.) Many water-soluble nitrates such as sodium nitrate, calcium nitrate, potassium nitrate, strontium nitrate, lithium nitrate, magnesium nitrate, ammonium nitrate, lanthanum nitrate, manganese nitrate and aluminum nitrate are proper salting-out agents. However, calcium nitrate is the preferred salt, and thus calcium hydroxide is preferably used for neutralization.

If no calcium hydroxide, or not enough of it, is added in the acid adjustment step, calcium nitrate has to be admixed. The effect of calcium nitrate on the ether extraction of uranyl nitrate is shown in two parallel experiments which were carried out under identical conditions with the exception that one experiment was carried out without the use of a salting-out agent, while the other one contained 200 grams of $Ca(NO_3)_2 \cdot 4H_2O$ per liter. In both instances the feed:ether ratio was 1:2; the feed contained 2.3 lbs. uranium per gallon and was 0.5 N in excess nitric acid. The ether was 1 N in nitric acid. The ether extract obtained was washed with 10% of its volume of water and the effluent water was combined with the aqueous raffinate. Analysis showed that while, in the case of no salting-out agent, the uranium extraction was 86.2% of the quantity present in the feed, the extraction amounted to 99.7% when calcium nitrate was used.

Before adjustment of the acidity by adding lime or nitric acid, the feed solution is concentrated by heating so that after adjustment of acidity the solution contains a high concentration of uranyl nitrate. A very satisfactory feed composition, although not the only one suitable, is that containing between 25 and 30% by weight of uranyl nitrate hexahydrate; 10 to 15% calcium nitrate; 0.5 N in nitric acid; and 50% by weight of water. Such a solution has a specific gravity of between 1.4 and 1.7.

The feed solution contains all metals in the form of nitrates, with the exception of very small amounts of sulfate still retained. Sometimes a slight precipitation occurs in the feed solution and in this case it is wise to filter the feed solution once more prior to extraction.

Substantially water-immiscible dialkyl ethers are suitable for the process of this invention; however, diethyl ether is the preferred ether. Nitric acid is preferably added to the ether in order to avoid the transfer of acid from the aqueous feed to the ether during the extraction and thus the concentration change connected therewith, and also in order to avoid the formation and precipitation, in the aqueous phase, of hydrolysis products, for instance of hydroxy nitrates of lead, barium, etc., which would coat and perhaps even clog up the packing in the extraction column.

The effect of acid concentration in the ether on the extraction efficiency is obvious from two experiments, both of which were carried out with an aqueous feed containing 2.19 lbs. of uranium per gal., 200 grams of $Ca(NO_3)_2 \cdot 4H_2O$ per liter, and excess nitric acid in a concentration of 0.4 N. The flow rates in both instances were 30 gals./hr. for the aqueous feed and 60 gals./hr. for the ether. The acid content of the ether was the only variable and is shown in the table below, together with the results obtained.

| Expt. No. | Ether Acidity, N | Uranium Extraction, Percent |
|---|---|---|
| 1 | 0.95 | 99.4 |
| 2 | 0.35 | 97.2 |

An acid concentration from 0.5 to 1.5 N, and preferably from 0.7 to 1 N, in the ether was found to give excellent results.

In the extraction step the volume ratio of ether:feed solution should be as low as possible in order to obtain the highest possible uranium concentration in the extract formed. A ratio between 1.8 and 2 was found best. A total throughput (quantity of aqueous feed plus ether) of about 2100 gals./sq. ft. of free space per hour, in the case of a continuous extraction process in packed columns, was found very satisfactory. The embodiment using the ether as the continuous phase was preferred.

The temperature of the feed solution should be sufficiently high to prevent crystallization. A temperature of between about 30 and 35° C. was satisfactory; the ether temperature found best was between about 15 and 20° C. In one instance, using an extraction column, the feed ether entering near the bottom of the column had a temperature of 12° C., and the aqueous feed entering near the top had a temperature of about 35° C. The ether extract phase leaving at the top had a temperature of 28.5° C., while the temperature of the aqueous raffinate leaving at the bottom of the column had gone down to 24° C.

Any type of equipment known to those skilled in the art can be used for the extraction process. Columns using countercurrent operation are preferred. A packed column, for instance one filled with Raschig rings, was found to be better than one having sieve plates. A 4-inch-diameter glass column having a 20-foot long packed section and added top and bottom sections was used for the experimental work leading to this invention; the top of the column was provided with a cooling device to avoid boiling of the ether. At the top of the column there was a distributing pipe for the feed solution; a flow control valve was arranged in the raffinate effluent line to maintain the interface level at the bottom of the column.

The aqueous raffinate obtained in this acid extraction phase of the process, as described, may be treated for recovery of its ingredients. The method of treating the raffinate found very satisfactory comprised successively heating the raffinate whereby the dissolved ether and some water were removed, sparging with steam to remove and recover the bulk of the nitric acid, and adding milk of lime of a concentration of about 50%, preferably in an excess of about 15%, to precipitate any uranium as calcium uranate and to neutralize the remainder of the nitric acid. The calcium uranate precipitate is then separated by filtration and the filtrate is concentrated by evaporation and then cooled to 0° C. for crystallization and recovery of the calcium nitrate.

The acid ether extract is then treated for back-extraction of the uranyl nitrate and recovery of the ether; the latter can then be recycled into the process. The acid ether extract is contacted with water for this purpose. This step is also preferably carried out in a column. The amount of water required for this reextraction is dependent upon the acidity of the ether extract. At a concentration of 0.5 N nitric acid, about 1 volume of water is necessary for each 1.75 to 3 volumes of the extract. If the acidity is higher, approximately 1 volume of water is required for each 1.5 volumes of the ether extract. For the reextraction the acid ether extract preferably has a temperature of about 25° C. and the water a temperature of about 28° C.; the stripped ether leaving the column then usually has a temperature of about 26° C. The aqueous uranyl nitrate solution obtained, the "crude liquor," contains mainly uranyl nitrate, in an average concentration of about 1.5 lbs./gal., and some impurities such as silicon, phosphorus and molybdenum.

To this crude liquor there is then added an aqueous solution which is obtained in a later phase of the process, namely, the aqueous "wash extract" obtained in washing the neutral ether extract, as will be described more in detail later. This mixture of crude liquor and wash extract, the "crude liquor mixture" is then treated for removal of water and nitric acid. For this purpose, it is heated to a temperature of 118 to 138° C. whereby most of the water and 75% of the nitric acid are removed. The remainder of the nitric acid is removed by sparging with steam. Heating is preferably discontinued when the pH value of the molten salt, upon having been diluted a hundredfold, is between 2.7 and 3. At a temperature of about 118° C. and above, the ether-soluble complexes of phosphorus, silicon and molybdenum are broken up into almost ether-insoluble compounds and some of the water of hydration of the uranyl nitrate is removed. Water is then added to the hot liquor in order to "rehydrate" the uranium nitrate to a boiling point of 118° C., the boiling point of uranyl nitrate hexahydrate. The molten mass is then cooled to a temperature of between 104 and 61° C., preferably to between 99 and 82° C., but best to about 95° C. The uranyl nitrate hexahydrate thus obtained contains about 10 lbs. of uranium per gallon; it is now ready for extraction with neutral ether.

This uranyl nitrate hexahydrate of between 65 and 104° C. is added in a mixer to neutral ether having a temperature of between 10 and 20° C. A ratio of 1 volume of uranyl nitrate hexahydrate and 2 volumes of ether has been found satisfactory. In order to avoid the temperature in the extraction apparatus exceeding the boiling point of ether, a large amount of the ether solution is continually withdrawn and cycled through a cooler to lower its temperature to a maximum of about 30° C. and preferably a maximum of 25° C.; it is then returned to the extractor. The boiling point of ether is at 34.6° C. and that of pure uranyl nitrate hexahydrate at 118° C.; a diethyl ether solution containing 50% by weight of uranyl nitrate boils at 50° C. Two phases are obtained in this extraction process, one the "neutral ether solution" containing mainly ether and uranyl nitrate and a very minor amount of impurities and an "aqueous neutral waste solution" containing at least part of the water of hydration and the bulk of the impurities originally present in the molten uranyl nitrate hexahydrate.

For the neutral extraction a mixer was found satisfactory, which consisted of a 2-foot long glass pipe having a diameter of 4 inches. The neutral ether solution and the aqueous neutral waste solution obtained were pumped out of the bottom of the mixer through a heat exchanger, where the temperature of the mixture was reduced to 25° C. The mixture of the two phases was then introduced into a decanter or settling chamber which consisted of a 3-foot long glass pipe. The liquid mixture coming from the mixer was introduced 6 inches above the bottom of the decanter. In the decanter separation into neutral ether solution and aqueous neutral waste solution took place; the aqueous neutral waste solution was removed from the bottom of the column, while the neutral ether solution was taken off at its top.

The aqueous neutral waste solution is recycled and for this purpose it is mixed with the barium sulfate filtrate, as has been mentioned above.

The neutral ether solution not recycled to the mixer is then treated for further purification. For this purpose water in an amount ranging from 2 to 20% of the volume of the neutral ether solution, preferably about 10%, is added thereto and thoroughly contacted therewith. All impurities still present are thereby back-extracted into the water to form the "aqueous wash extract"; about 25% of the uranyl nitrate is also extracted. The ether contains the bulk of the uranium in a high degree of purity and is called the "washed neutral ether solution." The washing step is preferably carried out at an average temperature of about 25° C., using washing water of about 28° C. The aqueous wash extract, in order to avoid losses of uranium, is then recycled by mixing it with the crude liquor to form the "crude liquor mixture," as has been mentioned above.

This washing of the neutral ether solution was also carried out in a glass column similar to that used for the extraction steps. The water was forced into the ether solution under pressure from a jet near the top of the column whereby a fine dispersion and thorough contact were accomplished.

In the process of this invention the impurities present in the aqueous wash extract are thus transferred to the crude liquor, thence to the aqueous neutral waste solution, and thence, via the barium sulfate filtrate and the feed solution for acid extraction, to the aqueous raffinate obtained after the acid extraction step, while the uranium is not lost but recycled and finally recovered in the washed neutral ether solution.

The uranyl nitrate in the washed neutral ether solution is back-extracted into water, using 1 volume of water for from 1.75 to 2 volumes of washed neutral ether solution. For instance, the use of 21 gallons of water for 37 gallons of washed neutral ether solution gave very good results. The aqueous solution obtained by this back-extraction, the "product solution," usually contained about 3.3 lbs. of uranium per gallon. The temperature of the water used for the back-extraction is preferably about 28° C. and that of the washed neutral ether solution about 25° C. It was found that, at the place of maximum transfer of uranyl nitrate from the ether to the water, the temperature was lowered to about 6° C. Apart from this, all fluids flowing in or out of the column average a temperature of 25° C.±4° C. Back-extraction is preferably carried out in a column into which the water is introduced in the form of a spray. The "ether raffinate" obtained after the back-extraction of the uranyl nitrate is reusable, and it is usually recycled to the neutral extraction column where it, together with fresh ether, is contacted with the molten uranyl nitrate hexahydrate.

The aqueous product solution contains the uranyl nitrate in very pure form. This solution is preferably concentrated by evaporation to yield a molten uranyl nitrate hexahydrate which is then pumped into gas-fired pots of stainless steel and calcined therein to yield a very pure, molybdenum-free uranyl oxide ($UO_3$). This uranyl oxide can then be converted to other compounds or to metallic uranium, depending on the use desired of the uranium.

In the following, an example is given of the process of this invention for illustrative purposes without the intention to have the invention limited to the details given therein. In this example the ratios and quantities of the materials used are given; however, in certain phases and steps, for example in the extraction and reextraction steps, operation was carried out in a continuous manner so that the figures given represent proportions based on 100 lbs. of pitchblende.

*Example*

100 lbs. of pitchblende containing 65% by weight of uranium oxide ($U_3O_8$), 10% of silica, 6% of lead oxide, about 1% of ferric oxide, about 1% of molybdenum oxide, about 1.0% of phosphorus pentoxide, about 1% of carbon dioxide, about 7% of sulfur as $SO_4^=$, and small quantities of oxides of nickel, aluminum, calcium, boron, magnesium, copper, cobalt, manganese, vanadium, titanium, barium, radium and rare earths were added to 15 gallons of a sulfuric acid-nitric acid mixture containing 160 lbs. of a 45% nitric acid solution and 2–3 lbs. of a 93% sulfuric acid solution; the acid mixture after heating had a temperature of 100° C. The ore was digested with the acid mixture at 100° C. for one hour and the resulting reaction mass was then filtered and thereby separated into 16 gallons of a filtrate, the so-called digest filtrate, and 54 lbs. of a residue, the "gangue lead cake." This gangue lead cake contained mainly silica, lead sulfate and radium sulfate, and some uranium in the form of uranyl molybdate, while the digest filtrate contained the bulk of the uranium in the form of uranyl nitrate.

The gangue lead cake was processed for the recovery of the non-dissolved uranium. For this purpose the cake was contacted with 7.5 gallons of a solution containing 5.6 lbs. of sodium bicarbonate and 7.5 lbs. of sodium carbonate, and the resulting slurry was filtered. The filtrate was treated separately with 0.2 gallon of 50% caustic to recover the uranium by precipitation. The cake was washed twice with 7.5 gallons of a solution of sodium carbonate (0.25 lb./gal.) and the washings obtained were separately treated for uranium recovery by adding 0.1 gallon of a 50% sodium hydroxide solution to the washings. These additions of sodium hydroxide caused the uranium present as sodium-uranyl tricarbonate to be precipitated as sodium uranate. The precipitates were filtered off and then dissolved in 0.16 gallon of 45% nitric acid. The nitric acid solution was combined and processed with the digest filtrate from the ore digestion described above.

The digest filtrate was then treated first for removal of sulfate ions. For this purpose a total of 8 lbs. of barium carbonate was added thereto whereby a precipitate formed. It was separated from the solution as the "barium sulfate cake"; it weighed 13.5 lbs. and contained 70% barium sulfate. The barium sulfate cake underwent a series of three washings for removal of residual uranium. The first wash consisted of 10 gallons of weak nitric acid (1–2%), and the second and third washes were made with 15 gallons of a sodium carbonate solution of 0.25 lb./gal. Instead of the second sodium carbonate wash, 0.5 N nitric acid was also used; in fact this acid wash accomplished a better uranium removal than was obtained by the second sodium carbonate wash. The uranium was recovered from the washings by precipitation with 0.2 gallon of 50% sodium hydroxide solution, and the precipitate was dissolved in nitric acid and returned to the digestion tanks. The remaining solution, the "barium sulfate filtrate," amounted to 27 gallons; it contained 3.3 lbs. of uranyl nitrate per gallon.

This barium sulfate filtrate was made up to have contents suitable for the ether extraction. For this purpose the filtrate was first concentrated by heating in order to obtain a higher degree of extraction. The aim was to have a uranium concentration in the feed solution for the extraction of about 2.5 lbs./gal. After evaporation of part of the solvent water the volume of the solution was 22 gallons. To it were added 2 gallons of an "aqueous neutral waste solution" which was obtained in a second ether extraction step to be described later. The nitric acid concentration of the liquid mixture was then adjusted to 0.3 lb./gal. by adding lime to lower the acidity to the desired figure, and then 3 gallons of a solution containing 14 lbs. of calcium nitrate were added as a salting-out agent. The solution had a density of 55° Bé.

This feed solution was then passed into a mixer and contacted with 85 gallons of ether extract derived from the first extraction column, as will be described later. The mixture was then cooled to 27° C. and allowed to separate in a decanter into an aqueous phase and an ether phase. The aqueous phase was introduced near the top of an extraction column, while 43 gallons of ether 1 N in nitric acid were introduced near the bottom thereof. The ether extract obtained thereby was the ether extract with which the feed was mixed.

The ether phase obtained in the decanter was introduced near the bottom of a second column, the stripping column, for reextraction into 22 gallons of water which were introduced near the top of this column. The aqueous solution obtained thereby, the "crude liquor," contained 5 lbs. of uranyl nitrate per gallon and also 0.5 lb./gal. of nitric acid, 150–200 parts of molybdenum per million parts of uranium, 50–100 parts of iron per million parts of uranium, less than 50 parts of vanadium per million parts of uranium, and 10 parts of boron per million parts of uranium.

This crude liquor was then prepared for a second extraction step with acid-free ether. For this purpose it was stripped of dissolved ether by heating to 100° C. and then heated further whereby nitric acid and solvent water were removed. When a temperature of 137° C. was reached, the liquid was sparged with steam for completion of nitric acid removal. After dilution with water to a boiling point of 125° C., 6.5 gallons of "neutral feed" containing 137 lbs. of $UO_2(NO_3)_2 \cdot 6H_2O$ with the above-described impurities were obtained.

This neutral feed of 125° C. boiling point was then introduced at 90° C. into a mixer with 15 gallons of acid-free ether at 55° C.; the mixture was cooled to 27° C. and the two phases formed were allowed to separate in the "neutral decanter." The aqueous phase was the "aqueous neutral waste solution" referred to above, containing the major part of the remaining impurities. During the addition, part of the ether phase from the decanter was recycled through the mixer so that during the course of the addition 26 gallons were recycled, while 18 gallons of ether solution were introduced into a wash column. In this wash column 0.11 gallon of water per gallon of ether phase was introduced countercurrently to the ether phase. The aqueous wash extract obtained thereby contained the final traces of impurities. This aqueous wash extract was recycled to the nitric acid stripping step for the crude liquor. The washed neutral ether solution was introduced into a reextraction column and countercurrently contacted there with 0.75 gallon of distilled water per gallon of ether extract. The ether was thereby regenerated for reuse in neutral extraction. The aqueous product solution was found to be a pure solution of uranyl nitrate of the following composition: 3.0 lbs./gal. uranium of 6.3 lbs./gal. uranyl nitrate hexahydrate, 1 p. p. m. iron (= parts of iron per one million parts of uranium), 0.10 p. p. m. boron, 1 p. p. m. molybdenum, 1 p. p. m. vanadium, and some other elements in concentrations of the same order of magnitude. The over-all yield of uranium was 99%.

It will be understood that this invention is not to be limited to the details given herein but that it may be modified within the scope of the appended claims.

What is claimed is:

1. A process of recovering uranium values from materials containing said values together with impurities admixed therewith comprising providing a nitric acid solution of the material; adding a water-soluble nitrate as a salting-out agent thereby forming a feed solution; contacting said feed solution with diethyl ether whereby the bulk of uranyl nitrate and a minor quantity of impurities are taken up by the ether in the form of an acid ether extract while the bulk of the impurities remain in an aqueous raffinate; separating said acid ether extract from said aqueous raffinate; contacting said acid ether extract with water whereby said uranyl nitrate and impurities are reextracted into said water to form a crude liquor; separating said crude liquor from the ether extract; heating said crude liquor to at least about 118° C. to remove water and nitric acid and to obtain molten uranyl nitrate hexahydrate; cooling said molten uranyl nitrate hexahydrate to a temperature between 104 and 61° C.; contacting said uranyl nitrate hexahydrate with acid-free diethyl ether whereby the bulk of uranyl nitrate is dissolved into said acid-free ether to form a neutral ether solution, while water of hydration of said uranyl nitrate hexahydrate and the bulk of said impurities are contained in an aqueous neutral waste solution; separating said neutral ether solution from said aqueous neutral waste solution; contacting said neutral ether solution with from 2 to 20% of its volume of water whereby said impurities that have remained in said neutral ether solution are back-extracted into said water to form an aqueous wash extract; separating said wash extract from the uranyl nitrate-containing washed neutral ether solution formed; contacting said washed neutral ether solution with at least one-half its volume of water whereby uranyl nitrate is extracted into said water to form an aqueous product solution and an ether raffinate; and separating said product solution from said ether raffinate.

2. The process of claim 1 wherein the aqueous neutral waste solution is recycled by mixing it with the acid feed solution.

3. The process of claim 1 wherein said feed solution contains excess nitric acid in a concentration between 0.5 and 2 N.

4. The process of claim 3 wherein the salting-out agent is calcium nitrate.

5. The process of claim 4 wherein said feed solution contains about 200 grams of calcium nitrate tetrahydrate per liter.

6. The process of claim 1 wherein the diethyl ether for contacting said feed solution contains nitric acid.

7. The process of claim 6 wherein the nitric acid concentration in the ether ranges between 0.5 and 1.5 N.

8. The process of claim 7 wherein the nitric acid concentration in the ether ranges between 0.7 and 1 N.

9. A process of recovering uranium values from pitchblende containing said uranium values together with impurities comprising dissolving said pitchblende in a mixture of concentrated nitric acid and sulfuric acid; separating the solution from a residue whereby a digest liquor is formed which contains said uranium values as uranyl nitrate and some of said impurities and a residue remains which contains acid-insolubles of said impurities; separating said residue from said digest liquor; adding a barium salt to the resulting digest filtrate whereby any excess sulfuric acid is precipitated in the form of barium sulfate; filtering said barium sulfate from the solution whereby a barium sulfate filtrate is obtained; adjusting the concentration of excess nitric acid in said barium sulfate filtrate to one between 0.5 and 2 N; adding calcium nitrate tetrahydrate to the barium sulfate filtrate to obtain a concentration of about 200 grams per liter thereby forming a feed solution; contacting said feed solution with diethyl ether containing nitric acid whereby the bulk of uranyl nitrate and a minor quantity of said impurities are taken up by the ether in the form of an acid ether extract while the bulk of the impurities remain in an aqueous raffinate; separating said acid ether extract from said aqueous raffinate; contacting said acid ether extract with water whereby said uranyl nitrate and impurities are reextracted into said water to form a crude liquor; separating said crude liquor from the ether extract; heating said crude liquor to at least about 118° C. to remove water and nitric acid and to obtain molten uranyl nitrate hexahydrate; cooling said molten uranyl nitrate hexahydrate to a temperature between 104 and 61° C.; contacting said uranyl nitrate hexahydrate with acid-free diethyl ether whereby the bulk of uranyl nitrate is dissolved into said acid-free ether to form a neutral ether solution, while the bulk of said impurities are contained in an aqueous neutral waste solution; separating said neutral ether solution from said aqueous neutral waste solution; contacting said neutral ether solution with from 2 to 20% of its volume of water whereby said impurities that have remained in said neutral ether solution are back-extracted into said water to form an aqueous wash extract; separating said aqueous wash extract from the uranyl nitrate-containing washed neutral ether solution formed; contacting said washed neutral ether solution with at least one-half its volume of water whereby uranyl nitrate is extracted into said water to form an aqueous product solution and an ether raffinate; and separating the product solution from said ether raffinate.

10. The process of claim 9 wherein the aqueous neutral waste solution is recycled by mixing it with the barium sulfate filtrate.

11. The process of claim 9 wherein the sulfuric acid content in the nitric acid is excessive of that stoichiometrically required for precipitation of such impurities which form insoluble sulfates.

12. The process of claim 11 wherein the excess is from 2 to 7 times the stoichiometric amount.

13. The process of claim 9 wherein the barium salt is barium nitrate.

14. The process of claim 9 wherein the barium salt is barium carbonate.

15. The process of claim 1 wherein said crude liquor is heated to a temperature between about 118 and 138° C. whereby practically all of the water and the bulk of the nitric acid are removed.

16. The process of claim 1 wherein said crude liquor is heated to a temperature between about 118 and 138° C. whereby practically all of the water and the bulk of the nitric acid are removed, the crude liquor is then sparged with steam whereby the remainder of the nitric acid is removed, water is then added to said steam-sparged liquor in a quantity to obtain the uranyl nitrate hexahydrate and the rehydrated liquor is cooled to a temperature between 99 and 82° C. prior to contacting said uranyl nitrate hexahydrate with acid-free diethyl ether.

17. The process of claim 16 wherein the uranyl nitrate hexahydrate is cooled to about 95° C.

18. The process of claim 1 wherein 1 volume of said uranyl nitrate hexahydrate is contacted with about 2 volumes of acid-free diethyl ether.

19. The process of claim 1 wherein said neutral ether solution is contacted with about 10% of its volume of water.

20. A process of recovering uranium values from pitchblende containing uranium oxide together with silica, lead oxide, molybdenum oxide, radium oxide and phosphate anions as impurities, comprising dissolving the pitchblende in a 95° C. hot mixture of nitric acid and sulfuric acid; digesting the mixture for several hours at about 95° C. whereby a solution is formed containing uranyl nitrate, phosphomolybdic acid, silicomolybdic acid, nitric acid and excess sulfuric acid and a residue remains mainly containing silica, lead sulfate and radium sulfate; separating said residue, and gangue lead cake, from said solution to obtain a digest filtrate; adding barium carbonate to the resulting digest filtrate, the quantity of said barium carbonate being in excess of that stoichiometrically required for the precipitation of the sulfate anions present in the form of barium sulfate; removing the barium sulfate by filtration, thereby obtaining a barium sulfate filtrate; adjusting the nitric acid concentration in said barium sulfate filtrate and adding calcium nitrate thereto so as to obtain a feed solution in which the concentration of excess acid is between 0.5 and 2 N and the calcium nitrate concentration is about 200 grams of the tetrahydrate per liter; contacting said feed solution with diethyl ether containing nitric acid in a concentration of from 0.7 to 1 N whereby the bulk of uranyl nitrate and a minor quantity of impurities are taken up by said ether in the form of an acid ether extract, while the bulk of the impurities remain in an aqueous raffinate; separating said acid ether extract from said aqueous raffinate; contacting said acid ether extract with about 1 volume of water for each 1.5 to 3 volumes of acid ether extract whereby the uranyl nitrate and the phosphorus-, silicon- and molybdenum-containing impurities are reextracted into said water to form a crude liquor; separating said crude liquor from the ether extract; heating said crude liquor to a temperature of between about 118 and 138° C. whereby all of the water and most of the nitric acid are removed and molten uranyl nitrate at least partially hydrated is obtained; sparging said hydrated uranyl nitrate with steam to remove the remainder of the nitric acid; adding water to said hydrated uranyl nitrate to obtain molten uranyl nitrate hexahydrate; cooling said molten uranyl nitrate hexahydrate to about 95° C.; contacting said molten uranyl nitrate hexahydrate with acid-free diethyl ether, using about 2 volumes of ether for 1 volume of uranyl nitrate hexahydrate, whereby the bulk of the uranyl nitrate is dissolved into said acid-free ether to form a neutral ether solution while the bulk of said remaining impurities are contained in an aqueous neutral waste solution; separating said neutral ether solution from said aqueous neutral waste solution; contacting said neutral ether solution with about 10% of its volume of water whereby said impurities that have remained in said neutral ether solution are selectively back-extracted into said water to form a wash extract; separating said wash extract from the uranyl nitrate-containing washed neutral ether solution formed; contacting said washed neutral ether solution with about 0.75 volume of water per volume of washed neutral ether solution whereby uranyl nitrate is extracted into said water to form an aqueous product solution and an ether raffinate; and separating said product solution from said ether raffinate.

21. The process of claim 20 wherein said aqueous neutral waste solution is recycled by mixing it with the barium sulfate filtrate.

22. The process of claim 20 wherein the product solution is heated to about 118° C. whereby the bulk of the water is evaporated and molten uranyl nitrate hexahydrate is obtained, the molten uranyl nitrate hexahydrate is then heated to higher temperatures whereby decomposition takes place and pure uranium trioxide is formed.

23. The process of claim 20 wherein the aqueous neutral waste solution is recycled by mixing it with the barium sulfate filtrate, part of the neutral ether solution is recycled as part of the acid-free ether for contact with the molten uranyl nitrate hexahydrate, the aqueous wash extract is recycled by mixing it with the crude liquor and the ether raffinate is recycled by mixing it with the acid-free ether for extraction of the molten uranyl nitrate hexahydrate.

24. A continuous process of recovering uranium values from a nitric acid solution containing said uranium values together with silicon values, phosphorus values and moylbdenum values in the form of phosphomolybdic and silicomolybdic acids comprising adding calcium nitrate to said solution whereby a feed solution is obtained; contacting said feed solution with diethyl ether whereby the bulk of said uranium values and a quantity of said other values are taken up by said ether in the form of an acid ether extract while the bulk of said other values remain in an aqueous raffinate; separating said acid ether extract from said aqueous raffinate; contacting said acid ether extract with water whereby said uranium and other values are extracted into said water to form a crude liquor; separating said crude liquor from an ether phase; heating said crude liquor to at least about 118° C. to remove water and nitric acid and to obtain molten uranyl nitrate hexahydrate; cooling said molten uranyl nitrate hexahydrate to a temperature between 104 and 61° C.; contacting said molten uranyl nitrate hexahydrate with acid-free diethyl ether whereby the bulk of the uranyl nitrate and minor quantities of the remaining other values are dissolved into said acid-free ether to form a neutral ether solution while the bulk of said remaining other values are contained in an aqueous neutral waste solution; separating said neutral ether solution from said aqueous neutral waste solution; mixing said aqueous neutral waste solution with said feed solution; contacting said neutral ether solution with about 10% of its volume of water whereby said other values that have remained in said neutral ether solution are back-extracted into said water to form a wash extract; separating said wash extract from the uranium nitrate-containing washed neutral ether solution formed; contacting said washed neutral ether solution with about 0.75 volume, of its volume, of water whereby said uranium nitrate is extracted into said water to form an aqueous product solution and an ether raffinate; and separating said product solution containing pure uranyl nitrate from said ether raffinate.

References Cited in the file of this patent
UNITED STATES PATENTS

| | | |
|---|---|---|
| 2,211,119 | Hixson et al. | Aug. 13, 1940 |
| 2,227,833 | Hixson et al. | Jan. 7, 1941 |

OTHER REFERENCES

Katzin et al.: U. S. Atomic Energy Commission declassified Document No. AECD-2758, Nov. 20, 1947, 12 pages.

Hoffman: Abstract of application Serial No. 661,339, publ. June 30, 1953, 671 O. G. 1496.